(12) United States Patent
Kanazawa et al.

(10) Patent No.: US 7,045,228 B2
(45) Date of Patent: May 16, 2006

(54) MAGNETIC TAPE

(75) Inventors: Minoru Kanazawa, Kanagawa (JP); Masami Sato, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/067,695

(22) Filed: Mar. 1, 2005

(65) Prior Publication Data

US 2005/0196648 A1 Sep. 8, 2005

(30) Foreign Application Priority Data

Mar. 5, 2004 (JP) .......................... P.2004-062652

(51) Int. Cl.
*G11B 5/68* (2006.01)

(52) U.S. Cl. ................................... 428/845; 428/848.6

(58) Field of Classification Search ................ 428/845, 428/848.6

See application file for complete search history.

(56) References Cited

U.S. PATENT DOCUMENTS 5,423,239 A * 6/1995 Sakai et al. .................... 83/56
6,627,334 B1 * 9/2003 Iida et al. .................. 428/847

FOREIGN PATENT DOCUMENTS

| JP | 5-182178 A | 7/1993 |
| JP | 9-153212 A | 6/1997 |
| JP | 11-296839 A | 10/1999 |
| JP | 2000-207732 A | 7/2000 |

* cited by examiner

*Primary Examiner*—Stevan A. Resan
(74) *Attorney, Agent, or Firm*—Sughrue Mion, PLLC (57) ABSTRACT

A magnetic tape comprising: a coating layer containing ferromagnetic powder and a binder; a support; and a back layer, in this order, which satisfies the following conditions (1) to (3): (1) on a cut plane of the tape, an apex of a biggest convexity of the support does not protrude from a line connecting an apex of a biggest convexity of the coating layer and an apex of a biggest convexity of the back layer; (2) a Young's modulus in a thickness direction of a surface of the magnetic layer is from 1,000 to 2,500 kg/mm² (from 9.8 to 24.5 GPa); and (3) a Young's modulus in a thickness direction of a surface of the back layer is from 600 to 2,000 kg/mm² (from 5.9 to 19.6 GPa).

11 Claims, 2 Drawing Sheets

MAGNETIC TAPE

FIELD OF THE INVENTION

The present invention relates to a magnetic tape used as the external recording medium for recording computer data.

BACKGROUND OF THE INVENTION

In recent years, development and study of magnetic tapes for recording computer data (so-called backup tapes) are energetically carried on. With the increase of throughput and the miniaturization of recording and reproducing systems, it is desired that magnetic tapes themselves for such use be miniaturized and have greater recording capacity as well. For the miniaturization of magnetic tapes, there are several means such as a means of fining of magnetic particles to be used, a means of increasing packing density, and a means of thinning a magnetic layer. Further, for the purpose of the achievement of rapid processing of a great deal of throughput in the system, magnetic tapes are strongly desired to have higher reliability more than before such that high running durability is ensured in repeating running at high speed, an error does not occur in use in broad environmental conditions (in particular, under fluctuating temperature and humidity conditions), and stable recording and reproducing can be carried out.

In the latest magnetic tapes, a magnetic recording medium having a two-layer structure comprising a nonmagnetic support having thereon a nonmagnetic layer and a thinner magnetic layer provided on the nonmagnetic layer is proposed (e.g., in JP-A-5-182178 (The term "JP-A" as used herein refers to an "unexamined published Japanese patent application".)) for solving the problem of thickness loss of the reduction of output and the like that occur in the monolayer constitution of a magnetic layer. High density recording becomes possible by the thinning of a magnetic layer, so that a higher recording capacity can be achieved.

For obtaining a great recording capacity, it is advantageous to use a magnetic tape comprising two-layer structure as above, further, thinning the thickness of a magnetic layer (the total thickness) is also a means that is often utilized for obtaining a great recording capacity. Since the strength of a magnetic tape per se generally becomes insufficient when the thickness of the magnetic tape is lessened, running durability is liable to lower, e.g., by the occurrence of deformation of the tape during running at high speed.

Accordingly, it is proposed to use support materials having relatively high rigidity, e.g., aramid, in a magnetic tape (JP-A-11-296839).

However, even in such a case, in the manufacturing process of a magnetic tape, when the web of a continuous length and broad wide magnetic tape is slit to a prescribed width (e.g., 3.8 mm, 8 mm, ½ inches), there are cases where the support protrudes from the magnetic layer and the back layer at the edge of the slit. Since a support is low in rigidity than a magnetic layer, the support sometimes deforms by sliding against the guide roller in the winding process after slitting. The deformation of a support is large on the side of sliding in contact with a guide roller, and small on the other side. Therefore, only one side of the support deforms in the state of being forced into the inside from the outside, and the thickness of the magnetic tape increases, so that the magnetic tape is not wound uniformly in the width direction and wound up in the state of one-side stretching.

The end face of winding in this state forms a radial pattern from the center of winding toward the outside. The radial pattern causes problems such as the failure in winding shape and output reduction. Further, whisker-like shavings (or thread-like shavings) are liable to occur in high speed running due to the deformation of support. The whisker-like shavings adhere to a drive as dirt, scatter in a cassette, adhere to the surface of a magnetic layer, cause clogging of a magnetic head, and often result in dropout.

JP-A-9-153212 proposes that a back layer should not protrude from the perpendicular line from the biggest convexity of a base so that a back layer is not shaved off. JP-A-11-296839 proposes that a back layer should be inside the perpendicular line from the biggest convexity of a base to prevent thread-like shavings from occurring.

JP-A-2000-207732 proposes that the outermost edge of a magnetic layer should not protrude from the outermost edge of a lower nonmagnetic layer for the improvement of durability.

However, prior techniques could not find yet the means capable of preventing the failure in winding shape and the reduction of output in a magnetic tape having high recording capacity, and the means effectively preventing the occurrence of whisker-like shavings (or thread-like shavings) at the time of high speed running.

SUMMARY OF THE INVENTION

An object of the invention is to provide a magnetic tape that is capable of achieving a great recording capacity, free from the failure in winding shape and output reduction due to the occurrence of radial pattern, free from the occurrence of whisker-like shavings (or thread-like shavings) at the time of high speed running, improved in magnetic head clogging and dropout, excellent in running durability and electromagnetic characteristics, and advantageously usable particularly for computer data recording.

The above object can be solved by the present invention as shown below.

1) A magnetic tape comprising a support having a coating layer containing at least ferromagnetic powder and a binder on one side and a back layer on the other side that satisfies the following conditions (1) to (3):

(1) on the cut plane (cutting plane) on the unforced side of the tape, the apex of the biggest convexity of the support does not protrude from the line connecting the apex of the biggest convexity of the coating layer and the apex of the biggest convexity of the back layer, (2) the Young's modulus in the thickness direction of the magnetic layer surface is from 1,000 to 2,500 kg/mm$^2$ (from 9.8 to 24.5 GPa), and (3) the Young's modulus in the thickness direction of the back layer surface is from 600 to 2,000 kg/mm$^2$ (from 5.9 to 19.6 GPa).

2) The magnetic tape as described in the above item 1), wherein the coating layer comprises a nonmagnetic layer containing nonmagnetic powder and a binder and a magnetic layer containing ferromagnetic powder and a binder coated on one side of the support in this order.

3) The magnetic tape as described in the above item 1) or 2), wherein on the cut plane on the unforced side, the angle formed by the line connecting the apex of the biggest convexity of the coating layer and the apex of the biggest convexity of the back layer and the extended line of the back layer surface is from 60 to 90°.

4) The magnetic tape as described in the above item 1), 2) or 3), wherein on the cut plane on the forced side, the apex of the biggest convexity of the support does not protrude from the line connecting the apex of the biggest convexity of the coating layer and the apex of the biggest convexity of the back layer.

In the magnetic tape in the invention, by prescribing the Young's modulus in the thickness direction of a magnetic layer surface and the Young's modulus in the thickness direction of a back layer surface and specifying the configuration of the cut plane on the unforced side, the deformation of a support in high speed running and the occurrence of whisker-like shavings are reduced, a radial pattern does not occur by the improvement of support deformation, a winding shape is bettered, and running becomes stable, as a result, excellent electromagnetic characteristics can be secured. On the other hand, the soiling of a magnetic head, the inside of a cassette and the obverse and reverse of a tape is reduced, so that dropout can be reduced. From the above results, the magnetic tape in the invention exhibits excellent running durability and electromagnetic characteristics, and can be advantageously used as a tape for computer data recording.

DESCRIPTION OF REFERENCE NUMERALS AND SIGNS

X: Width direction of a magnetic tape web
Y: Thickness direction of a magnetic tape web
1: Magnetic tape web
1a or 1b: Magnetic tape
2: Lower blade
3: Upper blade
4: Cut plane on the forced side
5: Cut plane on the unforced side
6: Support
7: Nonmagnetic layer
8: Magnetic layer
9: Back layer
10a or 10b: Apex of the biggest convexity of the coating layer
11a or 11b: Apex of the biggest convexity of the support
12a or 12b: Apex of the biggest convexity of the back layer
13: Line connecting apex 10a of the biggest convexity of the coating layer and apex 12a of the biggest convexity of the back layer
14: Perpendicular line in contact with apex 11a
15: Space
16: Perpendicular line intersecting perpendicular line 14 and passing apex 11a
17a or 17b: Intersection
19: Line connecting apex 10b of the biggest convexity of the coating layer and apex 12b of the biggest convexity of the back layer
20: Perpendicular line in contact with apex 11b
21: Space
22: Perpendicular line intersecting perpendicular line 20 and passing apex 11b
L1 or L2: Distance 23: Cutting apparatus
24: Pancake
25: Guide roller

DETAILED DESCRIPTION OF THE INVENTION

In the invention, the cut plane on the forced side is the plane of the side of a magnetic tape web cut with an upper blade forced with a lower blade, and the cut plane on the unforced side is the counter plane of the cut plane on the forced side that is the side of the magnetic tape web cut with the upper blade not forced with the lower blade.

The apex of the biggest convexity of the support on the cut plane on the unforced side means the utmost end part of the part in contact with the end line of the cut end when the line perpendicular to the width direction of the magnetic tape is scanned to the end line of the cut end obtained by projecting the magnetic tape so that the cut plane is perpendicular to the viewer.

The apex of the biggest convexity of the coating layer and the apex of the biggest convexity of the back layer on the cut plane on the unforced side are defined similarly to the apex of the biggest convexity of the support. When the coating layer comprises two or more layers, the position of the apex of the biggest convexity of the coating layer may be at any layer of the two or more layers.

The apex of the biggest convexity of the support, the apexes of the biggest convexities of the coating layer and the back layer respectively on the cut plane on the forced side are defined similarly to the definitions of the apexes of the biggest convexities of respective layers on the cut plane on the unforced side.

The fact that the apex of the biggest convexity of the support does not protrude from the line connecting the apex of the biggest convexity of the coating layer and the apex of the biggest convexity of the back layer on the cut plane on the unforced side means that the end line of the cut end including the apex of the biggest convexity of the support does not intersect the line connecting the apex of the biggest convexity of the coating layer and the apex of the biggest convexity of the back layer (it is allowable that both lines are in contact with each other).

The specific modes of a magnetic tape in the invention are described below with referring to the accompanied drawings.

Figure 1:
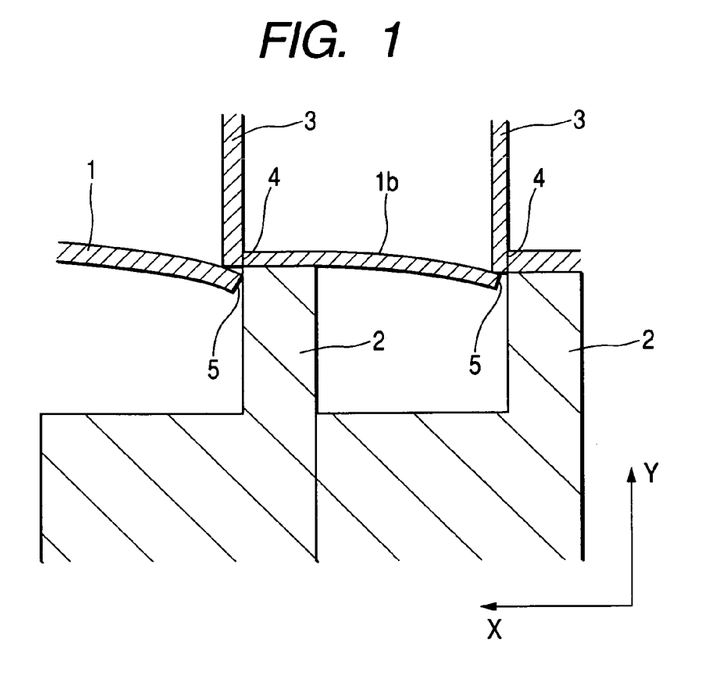
FIG. 1 is a view showing the cross section of the cut parts when the cutting part of the cutting apparatus is viewed so that the machine direction of the magnetic tape web is perpendicular to the viewer.
Figure 3:
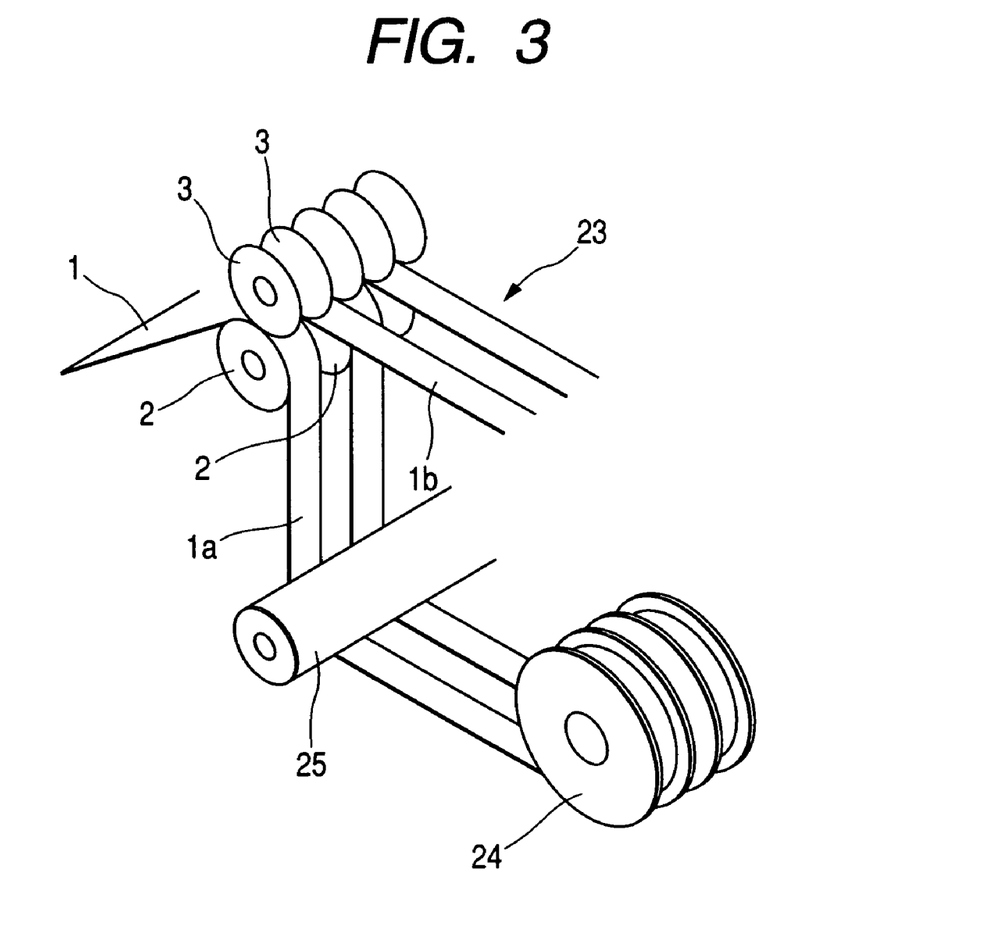
FIG. 3 is a view showing the example of a cutting apparatus.

FIG. 1 is the cross section of the cut parts when the cutting part of the cutting apparatus is viewed so that the machine direction of the magnetic tape web is perpendicular to the viewer. As a cutting apparatus, it is preferred that an upper blade and a lower blade consist of rotary blades as shown in FIG. 3.

X is the width direction of the magnetic tape web and Y is the thickness direction of the magnetic tape web.

Cut plane 4 on the forced side is the plane on the side of magnetic tape web 1 cut with upper blade 3 with being forced by lower blade 2, and it is the cut plane forced in Y direction.

Cut plane 5 on the unforced side is the counter plane of the cut plane on the forced side, which is the plane on the side of magnetic tape web 1 cut with the upper blade not forced by the lower blade, that is, the cut plane not forced in Y direction.

Figure 2:
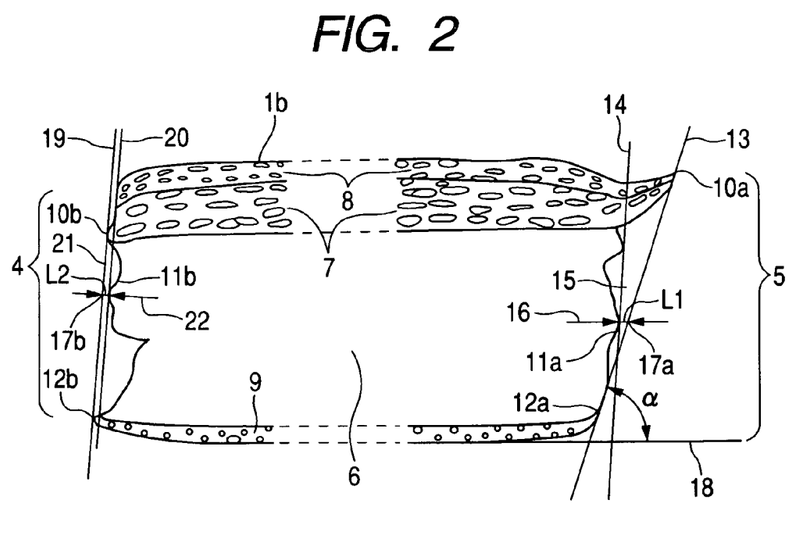
FIG. 2 is a view showing the enlargement of the cut parts (magnetic tape 1b) in FIG. 1 as it is.

FIG. 2 is a view showing the enlargement of the cut parts (magnetic tape 1b) in FIG. 1 as it is. In this example, the coating layer comprises a nonmagnetic layer and a magnetic layer, but a coating layer may also comprise a single magnetic layer.

Magnetic tape 1b comprises support 6 having nonmagnetic layer 7 containing nonmagnetic powder and a binder and magnetic layer 8 containing ferromagnetic powder and crystallite on one side and back layer 9 on the other side.

Apex 11a of the biggest convexity of the support on cut plane 5 on the unforced side is the utmost end part of the part in contact with the edge line of the cut end when the line perpendicular to the width direction of the magnetic tape is scanned to the end line of the cut end. Apex 10a of the biggest convexity of the coating layer and apex 12a of the biggest convexity of the back layer on the forced side cut plane can also be obtained in the same manner. Apex 11b of the biggest convexity of the support, apex 10b of the biggest convexity of the coating layer and apex 12b of the biggest convexity of the back layer on cut plane 4 on the forced side are also defined similarly to the above.

The fact that apex 11a of the biggest convexity of the support on the cut plane on the unforced side does not protrude from line 13 connecting apex 10a of the biggest convexity of the coating layer and apex 12a of the biggest convexity of the back layer is the same meaning as that space 15 is present between line 13 and perpendicular line 14 that is in contact with apex 11a.

In the invention, distance L1 between perpendicular line 14 and intersection 17a, which is the intersection of line 13 and perpendicular line 16 that intersects perpendicular line 14 and passes apex 11a, is preferably from 0 to −1 μm, more preferably from −0.2 to −0.5 μm. When space 15 is a space, the value of L1 is attached with sign "−", and when space 15 is a support, it is attached with "+". The value of L1 is also referred to as the base convex amount on the unforced side.

On cut plane 5 on the unforced side in the magnetic tape in the invention, the angle α formed by line 13 and extended line 18 of the back layer surface is preferably from 60 to 90°, more preferably from 75 to 90°, and particularly preferably from 80 to 88°.

On cut plane 4 on the forced side in the magnetic tape in the invention, it is preferred that apex 11b of the biggest convexity of the support should not protrude from line 19 connecting apex 10b of the biggest convexity of the coating layer and apex 12b of the biggest convexity of the back layer. This mode is defined as the same mode as the above cut plane on the unforced side. That apex 11b does not protrude from line 19 is the same meaning as that space 21 is present between line 19 and perpendicular line 20 in contact with apex 11b.

In the invention, distance L2 between perpendicular line 20 and intersection 17b, which is the intersection of line 19 and perpendicular line 22 that intersects perpendicular line 20 and passes apex 11b, is preferably from 0 to −1.1 μm, more preferably from −0.2 to −0.5 μm. When space 21 is a space, the value of L2 is attached with sign "−", and when space 21 is a support, it is attached with "+". The value of L2 is also referred to as the base convex amount on the forced side.

In the invention, as the means for controlling the configuration of the cut plane on the unforced side, the following means are exemplified.

1) Controlling the Young's modulus of a support to be smallish by making the Young's modulus in the thickness direction of the surface of a magnetic layer and the Young's modulus in the thickness direction of the surface of a back layer high.
2) Selecting the slitting conditions.

The above means 1) is described below.

In the invention, the Young's modulus in the thickness direction of the surface of a magnetic layer is controlled to 1,000 to 2,500 kg/mm² (from 9.8 to 24.5 GPa), preferably from 1,250 to 2,300 kg/mm² (from 12.25 to 22.54 GPa), and more preferably from 1,300 to 1,500 kg/mm² (from 12.74 to 14.70 GPa), and the Young's modulus in the thickness direction of the surface of a back layer is controlled to 600 to 2,000 kg/mm² (from 5.9 to 19.6 GPa), preferably from 700 to 1,800 kg/mm² (from 6.86 to 17.64 GPa), and more preferably from 800 to 1,300 kg/mm² (from 7.84 to 12.74 GPa).

The Young's modulus in the thickness direction of a magnetic layer surface and the Young's modulus in the thickness direction of a back layer surface may be the above ranges uniformly in the thickness directions as a whole, but it is sufficient that at least a part in the thickness direction of each layer surface is within the above range.

The Young's modulus of a support can be controlled by the selection of materials and the stretching methods, and the Young's modulus of orientation of a support in the machine direction is preferably controlled to 933 to 1,749 kg/mm2 (from 9.15 to 17.15 GPa).

The Young's modulus of a support in the machine direction is a value measured as follows.

Apparatus: For instance, Strograph V1-C (manufactured by Toyo Seiki Seisaku-Sho, Ltd.) is used.

A support is stretched under constant conditions (load: 5 kgf, stretching rate: 50 mm/min, temperature and humidity: 23° C.×50% RH, sample size: ½ inches×10 cm), the relationship between load and elongation is measured, and the gradient at the time when the support is elongated by 0.5% (a straight part) is found as the Young's modulus in the machine direction (modulus of elasticity).

The Young's moduli of a magnetic layer and a back layer can be controlled by selecting or combining the compositions of these layers [powders (the selection of materials, sizes, hardness, etc.), binders (the selection of materials, glass transition points (Tg), hardening agents, etc.), lubricants, etc.], the conditions of calendering treatment (the selection of materials of rolls, temperature, linear pressure, feed rate, etc.), and heat treatment conditions after layer formation (the selection of temperature, time, etc.).

As the slitting conditions, the slitting rate, the interlocking depth of blades, the peripheral speed ratio of an upper blade and a lower blade (peripheral speed of an upper blade/peripheral speed of a lower blade), and the continuous working time of slitting blades are exemplified.

It is preferred that the slitting rate is fast, from 150 to 400 m/min is specifically suitable, preferably from 250 to 350 m/min, and more preferably from 280 to 330 m/min. The interlocking depth of blades is preferably from 0.25 to 0.7 mm, but more preferred range is determined by the combination with other slitting conditions.

As the peripheral speed ratio of an upper blade and a lower blade, from 1.00 to 1.05 is specifically suitable, and more preferred range is also determined by the combination with other slitting conditions the same as the interlocking depth.

Since a conventional base convex amount (that is, those in which L1 shown in FIG. 2 is at least +) is not present on the cut plane on the unforced side of the magnetic tape in the invention, the deformation of the support and the occurrence of whisker-like shavings are reduced by the magnetic layer having high rigidity as the guard. The improvement of the deformation of the support results in the prevention of the occurrence of a radial pattern, so that irregular winding and electromagnetic characteristics are improved. On the other hand, since a conventional base convex amount on the cut plane on the unforced side is not present, the soiling of a magnetic head, the inside of a cassette and the obverse and reverse of the tape is reduced, as a result, dropout can be reduced. From the above things, the magnetic tape in the invention exhibits good running durability and electromagnetic characteristics and can be advantageously used particularly for computer data recording.

The magnetic tape in the invention is obtained by slitting a magnetic tape web in the machine direction, and the thickness is as a whole from 3 to 20 µm in general, the thickness is preferably from 4 to 10 µm in view of the increase of capacity, more preferably from 4 to 8 µm. The constitutional elements of the magnetic tape in the invention are described below.

As the supports usable in the invention, biaxially stretched polyethylene naphthalate (PEN), polyethylene terephthalate (PET), polyamide, polyimide, polyamideimide, aromatic polyamide, and benzoxazole are exemplified. These supports may be subjected in advance to surface activation treatment, e.g., corona discharge treatment, plasma treatment, adhesion assisting treatment or heating treatment. It is preferred that the supports usable in the invention have extremely excellent surface smoothness as small as from 0.1 to 20 nm of central line average surface roughness at a cut-off value of 0.25 mm, more preferably from 1 to 10 nm. It is preferred that these supports not only have a small central line average surface roughness but also are free from coarse spines having a height of 1 µm or more. The thickness of supports is from 4 to 15 µm, preferably from 4 to 9 µm. When a thin support is used, the unevenness of the back layer is liable to be imprinted on the magnetic layer by handling tension, but this phenomenon can be effectively prevented by the use of polyurethane resins having a high Tg in the magnetic layer. When the thickness of a support is 7 µm or less, it is preferred to use PEN or aromatic polyamide, e.g., aramid.

A nonmagnetic layer is substantially a nonmagnetic layer containing nonmagnetic powder and a binder. A nonmagnetic layer is required to be substantially nonmagnetic so as not to affect the electromagnetic characteristics of the magnetic layer that is coated on the nonmagnetic layer, but a trace amount of magnetic powder not affecting the electromagnetic characteristics of the magnetic layer may be contained. A nonmagnetic layer generally contains a lubricant besides these components.

As the nonmagnetic powders for use in a nonmagnetic layer, for example, nonmagnetic inorganic powders and carbon black are exemplified. Relatively hard nonmagnetic inorganic powders are preferred, e.g., those having Mohs' hardness of 5 or more is preferred, 6 or more is more preferred. As the examples of nonmagnetic inorganic powders, α-alumina, β-alumina, γ-alumina, silicon carbide, chromium oxide, cerium oxide, α-iron oxide, corundum, silicon nitride, titanium carbide, titanium dioxide, silicon dioxide, boron nitride, zinc oxide, calcium carbonate, calcium sulfate and barium sulfate are exemplified. These nonmagnetic inorganic powders can be used alone or in combination. Of these nonmagnetic inorganic powders, titanium oxide, α-alumina, α-iron oxide and chromium oxide are preferred. The average particle size of nonmagnetic inorganic powders is from 0.01 to 1.0 µm, preferably from 0.01 to 0.5 µm, and particularly preferably from 0.02 to 0.1 µm. Further, it is preferred that from 3 to 25 mass % (weight %) (preferably from 3 to 20 mass %) of nonmagnetic inorganic powders is nonmagnetic inorganic powders having Mohs' hardness of 5 or more (more preferably 6 or more) that can function as an abrasive.

In addition to nonmagnetic inorganic powders, carbon blacks are added to a nonmagnetic layer for the purpose of giving electrical conductivity to a magnetic layer to thereby prevent electric charge and, at the same time, ensuring smooth surface property of the magnetic layer formed on a nonmagnetic layer. It is preferred that carbon blacks for use in a nonmagnetic layer have an average particle size of 35 nm or less, more preferably from 10 to 35 nm, a specific surface area of from 5 to 500 $m^2/g$, more preferably from 50 to 300 $m^2/g$, a DBP oil absorption amount of from 10 to 1,000 ml/100 g, more preferably from 50 to 300 ml/100 g, pH of from 2 to 10, a moisture content of from 0.1 to 10%, and a tap density of from 0.1 to 1 g/ml.

Carbon blacks manufactured by various methods can be used in the invention. As the examples of such carbon blacks, furnace blacks, thermal blacks, acetylene blacks, channel blacks and lamp blacks are exemplified. The specific examples of commercially available carbon blacks include BLACKPEARLS 2000, 1300, 1000, 900, 800, 700, and VULCAN XC-72 (manufactured by Cabot Co., Ltd.), #35, #50, #55, #60 and #80 (manufactured by ASAHI CARBON CO., LTD.), #3950B, #3750B, #3250B, #2400B, #2300B, #1000, #900, #40, #30 and #10B (manufactured by MITSUBISHI CHEMICAL CORPORATION), CONDUCTEX SC, RAVEN 150, 50, 40, and 15 (manufactured by Columbia Carbon Co., Ltd.), and Ketjen Black EC, Ketjen Black ECDJ-500 and Ketjen Black ECDJ-600 (manufactured by Lion Akzo Co., Ltd.).

The addition amount of carbon blacks to a nonmagnetic layer is generally from 3 to 25 mass parts per 100 mass parts of the total nonmagnetic inorganic powders, preferably from 4 to 20 mass parts, and more preferably from 5 to 15 mass parts.

Thermoplastic resins, thermosetting resins, reactive resins and the mixtures of these resins are exemplified as the binders for use in a nonmagnetic layer in the invention, for instance. The examples of thermoplastic resins include polymers or copolymers containing vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether as the constitutional unit. The examples of copolymers include, e.g., vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, vinylidene chloride-acrylonitrile copolymers, butadiene-acrylonitrile copolymers, styrene-butadiene copolymers, and chlorovinyl ether-acrylic ester copolymers.

In addition to the above, polyamide resins, cellulose resins (e.g., cellulose acetate butyrate, cellulose diacetate, cellulose propionate, nitrocellulose, etc.), polyvinyl fluoride, polyester resins, polyurethane resins, and various kinds of rubber resins can also be utilized.

The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and polyisocyanate prepolymers, mixtures of polyester polyol and polyisocyanate, and mixtures of polyurethane and polyisocyanate.

As the polyisocyanates, isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates are exemplified.

As the polyurethane resins, polyurethane resins having well-known structures, e.g., polyester polyurethane, polyether polyurethane, polyether polyester polyurethane, polycarbonate polyurethane, polyester polycarbonate polyurethane and polycaprolactone polyurethane can be used.

As the binders for use in a nonmagnetic layer in the invention, it is preferred to use combinations of at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with a polyurethane resin, and combinations of these with further polyisocyanate as a hardening agent.

For obtaining more excellent dispersibility and the durability of the layer to be formed, it is preferred for binders to use at least one polar group selected from the following group introduced by copolymerization or addition reaction, according to necessity, e.g., —COOM, —SO$_3$M, —OSO$_3$M, —P=O(OM)$_2$, —O—P=O(OM)$_2$ (wherein M represents a hydrogen atom or an alkali metal), —OH, —NR$_2$, —N$^+$R$_3$ (wherein R represents a hydrocarbon group), an epoxy group, —SH and —CN. These polar groups are preferably added in an amount of from $10^{-1}$ to $10^{-8}$ mol/g, more preferably from $10^{-2}$ to $10^{-6}$ mol/g.

The amount of binders for use in a nonmagnetic layer is generally from 5 to 50 mass parts per 100 mass parts of the nonmagnetic powder, preferably from 10 to 30 mass parts. When a vinyl chloride resin, a polyurethane resin and polyisocyanate are used in combination in a nonmagnetic layer as the binders, it is preferred that the vinyl chloride resin is contained in an amount of from 5 to 70 mass %, the polyurethane resin is in an amount of from 2 to 50 mass %, and the polyisocyanate is in an amount of from 2 to 50 mass %, respectively in all the binders.

A lubricant is added to a nonmagnetic layer for relaxing the friction between a magnetic layer surface and a magnetic head, and the guide pole of a drive and a cylinder by oozing to the surface of a magnetic layer, to thereby maintain smooth sliding and contact conditions. For example, fatty acids and fatty acid esters can be exemplified as lubricants. As the examples of fatty acids, aliphatic carboxylic acids, e.g., acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid and palmitoleic acid, and mixture of these fatty acids are exemplified.

As the examples of fatty acid esters, various ester compounds can be exemplified, e.g., butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixtures of butyl stearate and butyl palmitate, oleyl oleate, butoxyethyl stearate, 2-butoxy-1-propyl stearate, acylated products of dipropylene glycol monobutyl ether with stearic acid, diethylene glycol dipalmitate, hexamethylenediol acylated with myristic acid, and glycerol oleate. These fatty acid esters can be used alone or in combination. The addition amount of lubricants in a nonmagnetic layer is generally from 0.2 to 20 mass parts per 100 mass parts of the total nonmagnetic powders.

A magnetic layer fundamentally comprises ferromagnetic powder and a binder. Further, a lubricant, electrically conductive powder (e.g., a carbon black) and an abrasive are general contained in a magnetic layer. As the ferromagnetic powders, e.g., γ-Fe$_2$O$_3$, Fe$_3$O$_4$, FeO$_x$ (x is from 1.33 to 1.5), CrO$_2$, Co-containing γ-Fe$_2$O$_3$, Co-containing FeO$_x$ (x is from 1.33 to 1.5), ferromagnetic alloy powders containing Fe, Ni or Co as the main component (75% or more) (ferromagnetic metal powders) and tabular hexagonal ferrite powders can be exemplified. Ferromagnetic metal powders and tabular hexagonal ferrite powders are preferably used as the ferromagnetic powders in the invention. Ferromagnetic metal powders are particularly preferably used.

The specific surface area of the ferromagnetic metal powders is preferably from 30 to 70 m$^2$/g, and the crystallite size obtained from an X-ray diffraction method is from 50 to 300 Å. When the specific surface area is too small, it is difficult to cope with high density recording, and when the specific surface area is too big, sufficient dispersion cannot be carried out, so that a magnetic layer having a smooth surface cannot be formed. Accordingly, it is also difficult to cope with high density recording.

It is necessary that the ferromagnetic metal powders contain at least Fe, and specifically the ferromagnetic metal powders are single metals or alloys comprising Fe, Fe—Co, Fe—Ni, Fe—Zn—Ni or Fe—Ni—Co as the main component. Fe can be used alone. For the purpose of achieving high recording density, the ferromagnetic metal powders preferably have the magnetic characteristics, such as saturation magnetization ($\sigma_s$) of 110 emu/g (A·m$^2$/kg), preferably from 120 to 170 A·m$^2$/kg, a coercive force (Hc) of from 1,950 to 2,650 Oe (from 156 to 212 kA/m), preferably from 2,000 to 2,500 Oe (from 160 to 200 kA/m), an average long axis length obtained by a transmission electron microscope of the powders of 0.5 μm or less, preferably from 0.01 to 0.3 μm, and an axis ratio (acicular ratio, long axis length/short axis length) of from 5 to 20, preferably from 5 to 15. For further improving the magnetic characteristics, nonmetals, e.g., B, C, Al, Si and P, and salts or oxides thereof may be contained in the compositions of ferromagnetic metal powders. In general, a layer of oxide is formed on the surfaces of particles of the metal powders for chemical stabilization.

The tabular hexagonal ferrite powders for use in the invention have a specific surface area of from 25 to 65 m$^2$/g, and a tabular ratio (tabular diameter/tabular thickness) of from 2 to 15, an average tabular size of from 0.02 to 1.0 μm. Too great or too small particle sizes of the tabular hexagonal ferrites result in the difficulty of high density recording for the same reason as the ferromagnetic metal powders. As tabular hexagonal ferrites, ferromagnetic powders that are tabular and have an axis of easy magnetization in the perpendicular direction to the tabular plane, specifically barium ferrite, strontium ferrite, lead ferrite, calcium ferrite, and cobalt-substitution products of these ferrites can be exemplified. Of these ferrites, cobalt-substitution products of barium ferrites and cobalt-substitution products of strontium ferrites are preferred. An element such as In, Zn, Ge, Nb or V may further be added to tabular hexagonal ferrites for the improvement of magnetic characteristics, if necessary. With respect to the magnetic characteristics of these tabular hexagonal ferrite powders, for achieving high recording density, particle size of the above range is necessary and, at the same time, saturation magnetization ($\sigma_s$) is at least 50 A·m$^2$/kg or more, preferably 53 m$^2$/kg or more. The coercive force of tabular hexagonal ferrite powders is from 700 to 2,000 Oe (from 56 to 160 kA/m), preferably from 900 to 1,600 Oe (from 72 to 128 kA/m).

Ferromagnetic powders preferably have a moisture content of from 0.01 to 2 mass %. It is preferred to optimize the moisture content of ferromagnetic powders by the kinds of binders. The pH of ferromagnetic powders is preferably optimized by the combination with the binder to be used, and the pH range is generally from 4 to 12, preferably from 5 to 10. Ferromagnetic powders at least partly surface-covered with Al, Si, P or oxides of them according to necessity are preferred, and the amount of the surface-treating compound is generally from 0.1 to 10 mass % based on the ferromagnetic powders. By the surface treatment of ferromagnetic powders, the adsorption amount of lubricant, e.g., fatty acid, becomes 100 mg/m$^2$ or less, so that a desired effect can be achieved even when the addition amount of lubricants to a magnetic layer is reduced. Soluble inorganic ions of, e.g., Na, Ca, Fe, Ni and Sr, are sometimes contained in ferromagnetic powders. The content of inorganic ions is preferably as small as possible, but the properties of ferromagnetic powders are not particularly affected if the content is 5,000 ppm or less. The above ferromagnetic powders and manufacturing methods thereof are disclosed in JP-A-7-22224.

It is preferred that ferromagnetic powders for use in the invention are treated with well-known compounds as sintering preventing agents, such as Al, Si, P, Ti and rare earth elements (e.g., Sc, Y, La, Ce, Pr, Nd, Pm, Sm, Eu, Gd, Tb, Dy, Ho, Er, Tm, Yb, Lu). In the invention, ferromagnetic powders are preferably treated at least with Y (yttrium). These sintering preventing agents are disclosed, e.g., in JP-A-52-134858, JP-A-56-114833, JP-A-57-73105, JP-A-6-25702 and JP-A-6-36265.

The lubricants usable in a nonmagnetic layer described above can be used in a magnetic layer. The addition amount of lubricants to a magnetic layer is generally from 0.2 to 20 mass parts per 100 mass parts of the ferromagnetic powder, preferably from 0.25 to 10 mass parts.

Carbon blacks are added to a magnetic layer for various purposes, such as the reduction of the surface electric resistance (Rs) of a magnetic layer, the reduction of a dynamic friction coefficient (μk value), the improvement of running durability, and the security of a smooth surface property of a magnetic layer. The carbon blacks usable in a nonmagnetic layer described above can be used in a magnetic layer. However, the average particle size of carbon blacks used in a magnetic layer is preferably from 5 to 350 nm, more preferably from 10 to 300 nm. Two or more kinds of carbon blacks having different average particle sizes can be used. The addition amount of carbon blacks is generally from 0.1 to 30 mass parts per 100 mass parts of the ferromagnetic powder, preferably from 0.2 to 15 mass parts.

As the abrasives, e.g., fused alumina, silicon carbide, chromium oxide ($Cr_2O_3$), corundum, artificial corundum, diamond, artificial diamond, garnet, and emery (main components: corundum and magnetic iron ore) can be exemplified. These abrasives preferably have a Mohs' hardness of 5 or more, more preferably 6 or more, and an average particle size of from 0.05 to 1 μm, more preferably from 0.2 to 0.8 μm. The addition amount of abrasives is generally from 3 to 25 mass parts per 100 mass parts of the ferromagnetic powder, preferably from 3 to 20 mass parts.

The binders usable in a nonmagnetic layer described above can be used in a magnetic layer. The addition amount of binders to a magnetic layer is generally from 5 to 50 mass parts per 100 mass parts of the ferromagnetic powder, preferably from 10 to 30 mass parts. It is preferred to use a vinyl chloride resin, a polyurethane resin and polyisocyanate in combination in a magnetic layer as the binder, and in that case, it is preferred that the vinyl chloride resin is contained in an amount of from 5 to 70 mass %, the polyurethane resin is in an amount of from 2 to 50 mass %, and the polyisocyanate is in an amount of from 2 to 50 mass %, respectively in all the binders.

A back layer preferably comprises a carbon black and inorganic powder having a Mohs' hardness of from 5 to 9 dispersed in a binder. Back layers having such a constitution are disclosed, e.g., in JP-A-9-115134, and the back layer in the invention can also be constituted similarly to these back layers. It is preferred to use two or more kinds of carbon blacks having different average particle sizes in combination. Specifically, it is preferred to use a fine particle carbon black having an average particle size of from 10 to 20 nm and a coarse particle carbon black having an average particle size of from 230 to 300 nm in combination. In general, by the addition of a fine carbon black as above, the surface electric resistance of a back layer and light transmittance can be set at low values. Since there are many kinds of magnetic recording apparatus making use of light transmittance of a tape to make it as a signal of operation, the addition of fine carbon blacks is particularly effective in such a case. In addition, fine carbon blacks are in general excellent in retention of a liquid lubricant and contribute to the reduction of a friction coefficient when lubricants are used in combination. On the other hand, coarse carbon blacks having a particle size of from 230 to 300 nm have a function as a solid lubricant and form minute spines on the surface of a back layer to thereby reduce the contact area and contribute to the reduction of a friction coefficient.

As the specific examples of commercially available products of fine carbon blacks, RAVEN 2000B (18 nm) and RAVEN 1500B (17 nm) (manufactured by Columbia Carbon Co., Ltd.), BP800 (17 nm) (manufactured by Cabot Co., Ltd.), PRINTEX 90 (14 nm), PRINTEX 95 (15 nm), PRINTEX 85 (16 nm), and PRINTEX 75 (manufactured by Degussa), and #3950 (16 nm) (MITSUBISHI CHEMICAL CORPORATION) are exemplified. As the specific examples of commercially available products of coarse carbon blacks, Thermal Black (270 nm) (manufactured by Cancarb Co., Ltd.), and RAVEN MTP (275 nm) (manufactured by Columbia Carbon Co., Ltd.) are exemplified.

When two kinds of carbon blacks respectively having different average particle sizes are used in combination in a back layer, the proportion of the contents (by mass) of a fine carbon black having an average particle size of from 10 to 20 nm and a coarse carbon black having an average particle size of from 230 to 300 nm is preferably the former/the latter of from 98/2 to 75/25, and more preferably from 95/5 to 85/15. The content of carbon blacks in a back layer (the total amount) is generally from 30 to 80 mass parts per 100 mass parts of the binder, and preferably from 45 to 65 mass parts.

Inorganic powders having a Mohs' hardness of from 5 to 9 are added for the purpose of reinforcing the back layer and giving running durability to the tape. A proper abrasive property is provided to the back layer by the addition of inorganic powders having a Mohs' hardness of from 5 to 9 and the adhesion of scratched powders to a tape guide pole is reduced. The average particle size of inorganic powders having a Mohs' hardness of from 5 to 9 is preferably from 80 to 250 nm, and more preferably from 100 to 210 nm.

The examples of inorganic powders having a Mohs' hardness of from 5 to 9 include, e.g., α-iron oxide, α-alumina and chromium oxide ($Cr_2O_3$). These powders may be used alone or in combination. Of the above inorganic powders, α-iron oxide and α-alumina are preferred. The content of inorganic powders in a back layer is generally from 3 to 30 mass parts per 100 mass parts of the carbon black, and preferably from 3 to 20 mass parts.

Lubricants may be contained in a back layer. Lubricants can be arbitrarily selected from among those usable in a nonmagnetic layer as described above. The content of lubricants added to a back layer is generally from 1 to 5 mass parts per 100 mass parts of the binder.

The binders usable in a nonmagnetic layer described above can be used in a back layer. It is preferred to use a nitrocellulose resin, a polyurethane resin, a polyester resin and polyisocyanate in combination as the binders. When a nitrocellulose resin, a polyurethane resin, a polyester resin and polyisocyanate are used in combination in a back layer as the binders, it is preferred that the nitrocellulose resin is contained in an amount of from 40 to 90 mass %, more preferably from 55 to 80 mass %, the polyurethane resin is in an amount of from 2 to 30 mass %, more preferably from 3 to 10 mass %, the polyester resin is in an amount of from 1 to 20 mass %, more preferably from 2 to 5 mass, and the polyisocyanate is in an amount of from 2 to 50 mass %, more preferably from 5 to 30 mass %, respectively in all the binders. Binders are generally used in a back layer in an amount of from 5 to 250 mass parts per 100 mass parts of the carbon black, preferably from 10 to 200 mass parts.

A dispersant can be added to the coating solution for forming each layer of a magnetic tape for well dispersing magnetic powder, nonmagnetic powder, etc., in a binder. If necessary, a plasticizer, electrically conductive particles (an antistatic agent) other than a carbon black and an antifungal agent can be added to each layer. As dispersants, fatty acids having from 12 to 18 carbon atoms (RCOOH, wherein R represents an alkyl group or an alkenyl group having from 11 to 17 carbon atoms), e.g., caprylic acid, capric acid, lauric acid, myristic acid, palmitic acid, stearic acid, behenic acid, oleic acid, elaidic acid, linoleic acid, linolenic acid and stearolic acid, metal soaps comprising alkali metals or alkaline earth metals of the above fatty acids, fluorine-containing compounds of the above fatty acids, amides of the above fatty acids, polyalkylene oxide alkylphosphoric ester, lecithin, trialkylpolyolefinoxy quaternary ammonium salt (the alkyl group has from 1 to 5 carbon atoms, the olefin is ethylene, propylene, or the like), sulfate and copper phthalocyanine can be used. These compounds can be used alone or in combination. It is particularly preferred to use copper oleate, copper phthalocyanine and barium sulfate in combination in a back layer. The use amount of dispersants is from 0.5 to 20 mass parts per 100 mass parts of the binder in any layer.

The manufacturing method of a magnetic tape in the invention is described below. In the manufacturing method of a magnetic tape in the invention, a process of forming a nonmagnetic layer and a magnetic layer on one side of the support of a long and broad wide web and then forming a back layer on the other side according ordinary methods, and a process of slitting the thus-obtained magnetic tape web into a prescribed width are included. Generally performed processes, such as a drying process, an orientation process, a calendering process or a winding process, are arbitrarily performed during, before or after each of the above processes.

A magnetic layer of a magnetic tape in the invention is preferably provided while a nonmagnetic layer is still wet. That is, a magnetic layer is preferably formed by a so-called wet-on-wet coating method of coating a magnetic layer coating solution after coating a nonmagnetic layer coating solution and while the nonmagnetic layer formed is still wet.

As the coating method by a wet-on-wet method, the following methods are exemplified.

(1) A method of coating a nonmagnetic layer on a support in the first place by using any of gravure coating, roll coating, blade coating and extrusion coating apparatus, and then coating a magnetic layer while the nonmagnetic layer is still wet by means of a support-pressing type extrusion coating apparatus (refer to JP-A-60-238179, JP-B-1-46186 (the term "JP-B" as used herein means an "examined Japanese patent publication"), and JP-A-2-265672.

(2) A method of coating a magnetic layer and a nonmagnetic layer on a support almost simultaneously with a coating apparatus comprising a single coating head equipped with two slits for feeding coating solutions (refer to JP-A-63-88080, JP-A-2-17971 and JP-A-2-265672).

(3) A method of coating a magnetic layer and a nonmagnetic layer on a support almost simultaneously by using an extrusion coating apparatus equipped with a backup roll (refer to JP-A-2-174965).

In the invention, it is preferred to form a nonmagnetic layer and a magnetic layer by a simultaneous multilayer coating method.

It is preferred to slit the thus-manufactured magnetic tape web into a prescribed width by the slitting method and apparatus (shown in FIG. 3) as disclosed in JP-A-9-153212.

By utilizing this method, a tape web can be cut to a tape having a desired cut plane on the unforced side and a cut plane on the forced side as shown in FIG. 2.

EXAMPLE

The invention will be described more specifically with referring to examples. In the examples "parts" means "mass parts" unless otherwise indicated.

Examples 1 to 6 and Comparative Examples 1 to 6

Preparation of Coating Solution for Forming Nonmagnetic Layer:

| | |
|---|---|
| Nonmagnetic powder, $\alpha$-$Fe_2O_3$ hematite | 80 parts |
| Average long axis length: | 0.15 μm |
| Specific surface area ($S_{BET}$): | 52 $m^2$/g |
| pH: | 8 |
| Tap density: | 0.8 g/ml |
| DBF oil absorption amount: | from 27 to 38 ml/100 g |
| Surface treating compounds: | $Al_2O_3$ and $SiO_2$ |
| Carbon black | 20 parts |
| Average primary particle size: | 16 nm |
| DBP oil absorption amount: | 80 ml/100 g |
| pH: | 8.0 |
| Specific surface area ($S_{BET}$): | 250 $m^2$/g |
| Volatile content: | 1.5% |
| Vinyl chloride copolymer | 12 parts |
| MR-104 (manufactured by Nippon Zeon Co., Ltd.) | |
| Polyester polyurethane resin | 5 parts |
| Neopentyl glycol/caprolactone polyol/MDI = 0.9/2.6/1 | |
| —$SO_3Na$ group content: | $1 \times 10^{-4}$ eq/g |
| $\alpha$-$Al_2O_3$ | 1 part |
| Average particle size: | 0.1 μm |
| Butyl stearate | 1 part |
| Stearic acid | 1 part |
| Methyl ethyl ketone | 100 parts |
| Cyclohexanone | 50 parts |
| Toluene | 50 parts |

Preparation of Coating Solution for Forming Magnetic Layer:

In the following composition, a parts of vinyl chloride copolymer and b parts of polyester polyurethane resin are shown in Table 1 below.

| | |
|---|---|
| Ferromagnetic metal powder | 100 parts |
| Composition: Fe/Co = 100/30 | |
| (atomic ratio) | |
| Hc: | 191 kA (2,400 Oe) |
| Specific surface area ($S_{BET}$): | 48 m$^2$/g |
| Crystallite size: | 130 Å |
| Surface treating compounds: | $Al_2O_3$ and $Y_2O_3$ |
| Particle size (long axis length): | 0.06 μm |
| Acicular ratio: | 6 |
| $\sigma_s$: | 120 A · m$^2$/kg |
| | (120 emu/g) |
| Vinyl chloride copolymer | a parts |
| MR-104 (manufactured by Nippon Zeon Co., Ltd.) | |
| Polyester polyurethane resin | b parts |
| Neopentyl glycol/caprolactone polyol/MDI = 0.9/2.6/1 | |
| —SO$_3$Na group content: | 1 × 10$^{-4}$ eq/g |
| α-Al$_2$O$_3$ | 3 parts |
| Average particle size: | 0.1 μm |
| α-Al$_2$O$_3$ | 2 parts |
| Average particle size: | 0.23 μm |
| Carbon black | 0.5 parts |
| Average particle size: | 0.08 μm |
| Butyl stearate | 1 part |
| Stearic acid | 5 parts |
| Methyl ethyl ketone | 90 parts |
| Cyclohexanone | 30 parts |
| Toluene | 60 parts |

Preparation of Coating Solution for Forming Back Layer:

In the following composition, c parts of nitrocellulose resin and d parts of polyurethane resin are shown in Table 1 below.

| | |
|---|---|
| Fine carbon black powder | 100 parts |
| BP-800 (manufactured by Cabot Co., Ltd.) | |
| Average particle size: | 17 nm |
| Coarse carbon black powder | 10 parts |
| Thermal Black (manufactured by Cancarb Co., Ltd.) | |
| Average particle size: | 270 nm |
| α-Iron oxide | 15 parts |
| TF100 (manufactured by Toda Kogyo Corp.) | |
| Average particle size: | 110 nm |
| Mohs' hardness: | 5.5 |
| Nitrocellulose resin | c parts |
| Polyurethane resin | d parts |
| Polyester resin | 5 parts |
| Dispersant | |
| Copper oleate | 5 parts |
| Copper phthalocyanine | 5 parts |
| Barium sulfate | 5 parts |
| Methyl ethyl ketone | 2,200 parts |
| Butyl acetate | 300 parts |
| Toluene | 600 parts |

With each of the compositions for forming a nonmagnetic layer and a magnetic layer, the components were kneaded in an open kneader and then dispersed in a sand mill. Polyisocyanate (Coronate L, manufactured by Nippon Polyurethane Co., Ltd.) was added in an amount of 5 parts to the nonmagnetic layer dispersion and 8 parts to the magnetic layer dispersion. Further, 40 parts of a mixed solvent of methyl ethyl ketone and cyclohexanone was added to each dispersion, and each dispersion was filtered through a filter having a pore diameter of 1 μm to obtain coating solutions for forming a lower nonmagnetic layer and an upper magnetic layer. To the back layer composition were added 5 parts of polyisocyanate (Coronate L, manufactured by Nippon Polyurethane Co., Ltd.), 2,200 parts of methyl ethyl ketone, 300 parts of butyl acetate and 600 parts of toluene, and the components were kneaded in a continuous kneaded and then dispersed in a sand mill.

Each of the above-obtained dispersions was filtered through a filter having a pore diameter of 1 μm similarly to the above.

The thus prepared nonmagnetic layer coating solution was coated on each of the supports having different rigidity and thickness of from 6 to 8 μm (biaxially stretched polyethylene naphthalate, polyethylene terephthalate and polyamide), and immediately after that the magnetic layer coating solution was simultaneously coated in each prescribed dry thickness by multilayer-coating in a total thickness of the magnetic layer and the nonmagnetic layer of from 0.5 to 3 μm so that the total tape thickness after drying became from 8 to 12 μm. The coated layers were subjected to orientation with a cobalt magnet having a magnetic force of 3 T (3,000 G) and a solenoid having a magnetic force of 0.15 T (1,500 G) while both layers were still wet, and then drying. After drying, each web was subjected to calendering treatment with a calender of seven stages comprising a metal roll and an epoxy resin roll at a temperature of 60 to 100° C., a linear pressure between rolls of from 250 to 350 kg/cm, and a feed rate of from 180 to 250 m/min, and then a back layer having a thickness of from 0.1 to 1.0 μm was coated. After coating the back layer, each web was allowed to stand at 50 to 80° C. for 24 to 72 hours for the film reinforcement of the magnetic layer, nonmagnetic layer and back layer and the prevention of thermal deformation of the flexible support. After preservation under the constant temperature, the web was slit to a width of ½ inch with a cutting apparatus.

The realization of the cut plane by slitting of a magnetic recording medium in the invention can be achieved by the adjustment of the slitting conditions, such as the slitting rate, the interlocking depth of blades, the peripheral speed ratio of an upper blade (a male blade) and a lower blade (a female blade) (peripheral speed of an upper blade/peripheral speed of a lower blade), and the continuous working time of slitting blades, and the rigidities of the surfaces of a magnetic layer and a back layer, and the rigidity of a support (also referred to as a base).

EXAMPLES

Comparative Examples and Examples are described in detail below.

The details of the manufacturing conditions in Examples and Comparative Examples are shown in Table 1, Manufacturing Conditions in Examples and Comparative Examples.

Example 1

With each of the compositions for forming a nonmagnetic layer and a magnetic layer, the components were kneaded in an open kneader and then dispersed in a sand mill. Polyisocyanate (Coronate L, manufactured by Nippon Polyurethane Co., Ltd.) was added in an amount of 5 parts to the nonmagnetic layer dispersion and 8 parts to the magnetic layer dispersion. Further, 40 parts of a mixed solvent of methyl ethyl ketone and cyclohexanone was added to each dispersion, and each dispersion was filtered through a filter having a pore diameter of 1 µm to obtain coating solutions for forming a nonmagnetic layer and a magnetic layer. To the back layer composition were added 5 parts of polyisocyanate (Coronate L, manufactured by Nippon Polyurethane Co., Ltd.), 2,200 parts of methyl ethyl ketone, 300 parts of butyl acetate and 600 parts of toluene, and the components were kneaded in a continuous kneaded and then dispersed in a sand mill.

Each of the above-obtained dispersions was filtered through a filter having a pore diameter of 1 µm similarly to the above.

The obtained nonmagnetic layer coating solution and magnetic layer coating solution were simultaneously coated by multilayer-coating on a polyamide support having a thickness of 6.5 µm (a Young's modulus in the thickness direction: 1,749 kg/mm$^2$ (17.14 GPa)) in the dry thickness of the nonmagnetic layer of 1.5 µm and the magnetic layer of 0.2 µm, so that the total tape thickness after drying became 8.7 µm. The coated layers were subjected to orientation with a cobalt magnet having a magnetic force of 3 T (3,000 G) and a solenoid having a magnetic force of 0.15 T (1,500 G) while both layers were still wet, and then drying. After drying, the web was subjected to calendering treatment with a calender of seven stages comprising a metal roll and an epoxy resin roll at a temperature of 80° C., a linear pressure between rolls of 280 kg/cm (274.4 kN/m), and a feed rate of 180 m/min, and then a back layer having a thickness of 0.5 µm was coated. After coating the back layer, the web was allowed to stand at 70° C. for 24 hours for the film reinforcement of the magnetic layer, nonmagnetic layer and back layer and the prevention of thermal deformation of the flexible support. After preservation under the constant temperature, the web was slit to a width of ½ inch with a cutting apparatus with upper and lower blades having the history of 100,000 m (the history of the blades in meter is shown in Table 1), at an interlocking depth of blades of 0.25 mm, a peripheral speed ratio of an upper blade and a lower blade (peripheral speed of an upper blade/peripheral speed of a lower blade) of 1.00, and a slitting rate of 300 m/min, and the obtained tape was used for evaluation.

Example 2

A magnetic tape was prepared in the same manner as in Example 1 except that polyethylene terephthalate (a Young's modulus in the thickness direction: 955 kg/mm$^2$ (9.36 GPa)) was used as the flexible support, and, of the slitting conditions, the interlocking depth of blades was changed to 0.30 mm, and the peripheral speed ratio was changed to 1.05.

Example 3

A magnetic tape was prepared with the same flexible support and the compositions of coating layers as in Example 2. Calendering treatment was performed with a processor having elastic rolls at 90° C., a linear pressure of 280 kg/cm (274.4 kN/m), and a feed rate of 180 m/min. In slitting, upper and lower blades worked in length of 200,000 m as the history were used, and the web was slit to a width of ½ inch at an interlocking depth of 0.50 mm, a peripheral speed ratio of the upper blade and the lower blade of 1.00, and a slitting rate of 300 m/min, and the obtained tape was used for evaluation. The conditions other than calendering treatment conditions and the slitting conditions were the same as in Example 2.

Example 4

A magnetic tape was prepared by using polyethylene naphthalate having low rigidity as the flexible support (a Young's modulus in the thickness direction: 933 kg/mm$^2$ (9.14 GPa)). Calendering treatment was performed with a processor having elastic rolls at 90° C., a linear pressure of 250 kg/cm (245 kN/m), and a feed rate of 150 m/min. In slitting, upper and lower blades worked in length of 200,000 m as the history were used, and the web was slit to a width of ½ inch at an interlocking depth of 0.50 mm, a peripheral speed ratio of the upper blade and the lower blade of 1.05, and a slitting rate of 300 m/min, and the obtained tape was used for evaluation. The conditions other than the above were the same as in Example 3.

Example 5

The addition amounts of vinyl chloride/polyurethane in the magnetic layer were changed to 12 parts/5 parts, and the addition amounts of NC/polyurethane in the back layer were changed to 140 parts/20 parts. Calendering treatment was performed with a processor having elastic rolls at 80° C., a linear pressure of 250 kg/cm (245 kN/m), and a feed rate of 150 m/min. In slitting, upper and lower blades worked in length of 300,000 m as the history were used, and the web was slit to a width of ½ inch at an interlocking depth of 0.70 mm, a peripheral speed ratio of the upper blade and the lower blade of 1.00, and a slitting rate of 300 m/min, and the obtained tape was used for evaluation. The conditions other than the above were the same as in Example 4.

Example 6

Calendering treatment was performed with a processor having elastic rolls at 70° C., a linear pressure of 250 kg/cm (245 kN/m), and a feed rate of 150 m/min. In slitting, upper and lower blades worked in length of 300,000 m as the history were used, and the web was slit to a width of ½ inch at an interlocking depth of 0.70 mm, a peripheral speed ratio of the upper blade and the lower blade of 1.05, and a slitting rate of 300 m/min, and the obtained tape was used for evaluation. The conditions other than the above were the same as in Example 5.

Comparative Example 1

A magnetic tape was prepared by using polyamide having high rigidity as the flexible support, and the addition amounts of vinyl chloride/polyurethane in the magnetic layer were changed to 12 parts/2.5 parts, and the addition amounts of NC/polyurethane in the back layer were changed to 140 parts/10 parts. Calendering treatment was performed with a processor having metal rolls at 90° C., a linear pressure of 330 kg/cm (323.4 kN/m), and a feed rate of 200 m/min. In slitting, upper and lower blades worked in length of 100,000 m as the history were used, and the web was slit to a width of ½ inch at an interlocking depth of 0.50 mm, a peripheral speed ratio of the upper blade and the lower blade of 1.00, and a slitting rate of 350 m/min, and the obtained tape was used for evaluation. The conditions other than the above were the same as in Example 1.

Comparative Example 2

Calendering treatment was performed with a processor having metal rolls at 80° C., a linear pressure of 330 kg/cm (323.4 kN/m), and a feed rate of 200 m/min. In slitting, upper and lower blades worked in length of 100,000 m as the history were used, and the web was slit to a width of ½ inch at an interlocking depth of 0.50 mm, a peripheral speed ratio of the upper blade and the lower blade of 1.05, and a slitting rate of 350 m/min, and the obtained tape was used for evaluation. The conditions other than the above were the same as in Comparative Example 1.

Comparative Example 3

Calendering treatment was performed with a processor having metal rolls at 70° C., a linear pressure of 300 kg/cm (294 kN/m), and a feed rate of 200 m/min. In slitting, upper and lower blades worked in length of 100,000 m as the history were used, and the web was slit to a width of ½ inch at an interlocking depth of 0.50 mm, a peripheral speed ratio of the upper blade and the lower blade of 1.00, and a slitting rate of 350 m/min, and the obtained tape was used for evaluation. The conditions other than the above were the same as in Comparative Example 2.

Comparative Example 4

Calendering treatment was performed with a processor having metal rolls at 60° C., a linear pressure of 300 kg/cm (294 kN/m), and a feed rate of 200 m/min. In slitting, upper and lower blades worked in length of 100,000 m as the history were used, and the web was slit to a width of ½ inch at an interlocking depth of 0.50 mm, a peripheral speed ratio of the upper blade and the lower blade of 1.05, and a slitting rate of 300 m/min, and the obtained tape was used for evaluation. The conditions other than the above were the same as in Comparative Example 3.

Comparative Example 5

A magnetic tape was prepared by using polyethylene naphthalate having low rigidity as the flexible support, and the addition amounts of vinyl chloride/polyurethane in the magnetic layer were changed to 12 parts/5 parts, and the addition amounts of NC/polyurethane in the back layer were changed to 140 parts/20 parts. Calendering treatment was performed with a processor having elastic rolls at 60° C., a linear pressure of 250 kg/cm (245 kN/m), and a feed rate of 150 m/min. In slitting, upper and lower blades worked in length of 300,000 m as the history were used, and the web was slit to a width of ½ inch at an interlocking depth of 0.50 mm, a peripheral speed ratio of the upper blade and the lower blade of 1.00, and a slitting rate of 250 m/min, and the obtained tape was used for evaluation. The conditions other than the above were the same as in Comparative Example 4.

Comparative Example 6

A magnetic tape was prepared without performing heating treatment after calendering treatment. In slitting, upper and lower blades worked in length of 300,000 m as the history were used, and the web was slit to a width of ½ inch at an interlocking depth of 0.50 mm, a peripheral speed ratio of the upper blade and the lower blade of 1.05, and a slitting rate of 250 m/min, and the obtained tape was used for evaluation. The conditions other than the above were the same as in Comparative Example 5.

Each of the obtained magnetic tapes was evaluated as follows. The results of evaluations are shown in Table 2 below.

1) Measuring Method of the Base Convex Amount on the Unforced Side and the Base Convex Amount on the Forced Side sss A small piece of a magnetic tape was cut out so as to be capable of observing the end face on the unforced side and the end face on the forced side from the intersecting direction. The cut out piece was enveloped in an epoxy resin with a capsule for forming an observation sample of ultrathin section and, after hardening, the enveloped magnetic tape was cut out as the cross section as shown in FIG. 2 with a diamond knife (ultra-microtome, model LKB-V), subjected to electrically conductive treatment by coating Pt in a thickness of 100 Å, observed with model S-700 FE-SEM (a product of Hitachi, Ltd.) with 6,000 magnifications (sample gradient: 0°), and then photographed. The base convex amount on the unforced side and the base convex amount on the forced side were measured using the photograph taken with FE-SEM. In the measurement, n=3 was used both the end face on the unforced side and the end face on the forced side of each magnetic tape.

2) Measuring Method of Angle $\alpha$ on the Cut Plane on the Unforced Side

An angle formed by the reference line and the extended line of the back layer surface on the cut plane on the unforced side was measured from the above photograph, and this was taken as angle $\alpha$.

3) Measuring Method of Young's Moduli of Magnetic Layer Surface and Back Layer Surface Young's modulus (W) is a value defined by the following equation (1) in the load-excluding curve when a diamond indenter having a shape of a triangular pyramid, the radius of curvature of the tip of 100 nm, the angle of a blade of 65°, and the angle between edges of 115° is indented on the surface of a magnetic layer or a back layer with a load of 6 mgf (58.8 μN).

$$W = 1.8129 \times 10^{-1} H_1^{-1} \left(\frac{dP}{dH}\right)\left(\frac{\text{kg}}{\text{mm}^2}\right) \quad (1)$$

$$= 1.8 H_1^{-1} \left(\frac{dP}{dH}\right)(\text{MPa})$$

wherein $H_1$ is the displacement at load 0 of the tangential line on the maximum displacement of the load-excluding curve, and dP/dH is the gradient of the tangential line on the maximum displacement of load-excluding curve.

Measuring Instrument:

Hyper-micro-indentation hardness tester, model ENT-1100 (manufactured by ELIONIX CO., LTD.) was used as measuring instrument. The main specifications of the instrument are as follows.

Load-generation system: electromagnetic force system

Indenter: a triangular pyramid, the angle between edges of 115°, made of diamond Range of load: from 2 mgf to 100 gf (19.6 μN to 0.98 N)

Discrimination of load: 0.2 μN

Measuring method of displacement: The movement of the indenter is detected by electrostatic capacitance.

Range of displacement: ~20 μm

Discrimination of reading of displacement: 0.3 nm

Measuring Conditions:

A magnetic tape was cut in a size of 5 mm×5 mm and fixed on a sample table for measurement made of aluminum with an adhesive and, after being dried and fixed, allowed to stand in the measurement environment for about 30 minutes before measurement to adapt to the environment. The measuring conditions are as follows.

A magnetic tape was cut in a size of 5 mm×5 mm and fixed on a sample table for measurement made of CF5 (Nobinite, casting) with an instantaneous adhesive (Aron Alpha) and, after being dried and fixed, allowed to stand in the measurement environment for about 30 minutes before measurement.

Test load: 6 mgf (58.8 μN)
Number of division: 100
Step interval: 100 msec
Method of loading: A load was applied continuously to 6 mgf over 10 seconds, maintained the state of 6 mgf for 1 second, and then the load was excluded over 10 seconds.
Measuring environment: 28±0.1° C.
Measuring number n: Young's moduli were measured at nine spots of the magnetic layer surface or the back layer surface, and intermediate five data were used exclusive of data with a noise, data of great maximum displacement and data of small maximum displacement.

4) Evaluation of Winding Shape

The end face on the unforced side of a magnetic tape was photographed under oblique light with a digital camera. The state of the occurrence of radial pattern was visually evaluated from the photograph by the following four ranks.

◎: Radial pattern is not observed.

○: Radial pattern is slightly observed.

Δ: Light radial pattern is observed.

X: Heavy radial pattern occurs.

5) Evaluation of Soiling of Head

A head after running was observed with a digital microscope (manufactured by Keyence Corporation) and the state of soiling was evaluated by the following four ranks.

◎: The head is hardly soiled.

○: The head is soiled a little.

Δ: The head is considerably soiled.

X: The head is soiled heavily.

6) Evaluation of Dropout (DO)

Signals were recorded on a magnetic tape at a recording track width of 15 μm, a recording wavelength of 0.36 μm, and a tape feed rate of 2.5 m/sec, and the signals were reproduced with an MR head at a read track width of 7.5 μm, and a tape feed rate of 2.5 m/sec. The number of dropouts per 1 MB of recording was measured when the output reduced by 50% or more in 0.08 μsec or more. The following results were obtained.

Examples: From 0.5 to 1.0/MB, that is, good.

Comparative Examples: From 3 to 72/MB, that is, not good.

7) Evaluation of C/N Ratio

The measurement was performed by attaching to a drum tester a recording head (MIG, gap length: 0.15 μm, a track width: 18 μm, magnetic field intensity (Bs): 1.8 T) and an MR head for reproduction (a shield type head, gap length between shields: 0.2 μm, a track width: 4 μm). Single frequency signals of recording wavelength of 0.2 μm (50 MHz) were recorded at a relative speed of head-medium of 10 m/min, and the reproduced signals were analyzed by frequency with a spectrum analyzer (a product manufactured by Shiba Soku Co., Ltd.), and the ratio of the output voltage of the above single frequency signals to the noise voltage 1 MHz apart was taken as a C/N ratio (dB). Bias current was applied to the MR head at reproducing time so that the reproduction output became the maximum. The following results were obtained.

Examples: From 0 to 2.5 dB

Comparative Examples: From 0.3 to 2 dB

TABLE 1

Manufacturing Conditions in Examples and Comparative Examples

| Example No. | Base Kind of Material | Base Young's Modulus in Machine Direction (kg/mm²) | Addition amounts of a (vinyl chloride) and b (polyurethane) in magnetic layer, and c (NC) and d (polyurethane) in back layer Magnetic Layer (a/b) | Back Layer (c/d) |
|---|---|---|---|---|
| Comparative Example 1 | Polyamide | 1,749 | 12 parts/2.5 parts | 140 parts/10 parts |
| Comparative Example 2 | Polyamide | 1,749 | 12 parts/2.5 parts | 140 parts/10 parts |
| Comparative Example 3 | Polyamide | 1,749 | 12 parts/2.5 parts | 140 parts/10 parts |
| Comparative Example 4 | Polyamide | 1,749 | 12 parts/2.5 parts | 140 parts/10 parts |
| Example 1 | Polyamide | 1,749 | 12 parts/3 parts | 140 parts/15 parts |
| Example 2 | PET | 955 | 12 parts/3 parts | 140 parts/15 parts |
| Example 3 | PET | 955 | 12 parts/3 parts | 140 parts/15 parts |
| Example 4 | PEN | 933 | 12 parts/3 parts | 140 parts/15 parts |
| Example 5 | PEN | 933 | 12 parts/5 parts | 140 parts/20 parts |
| Example 6 | PEN | 933 | 12 parts/5 parts | 140 parts/20 parts |
| Comparative Example 5 | PEN | 933 | 12 parts/5 parts | 140 parts/20 parts |
| Comparative Example 6 | PEN | 933 | 12 parts/5 parts | 140 parts/20 parts |

| Example No. | Conditions of Calendering Treatment Kind of Roll | Temp. (° C.) | Linear Pressure (kg/cm) | Feed Rate (m/min) | Conditions of Heating Treatment Feed Rate (m/min) | Time (hrs) | Conditions of Slitting Rate (m/min) | Depth of Blades (mm) | Interlocking Speed Ratio | Peripheral Work History of Blades (m) |
|---|---|---|---|---|---|---|---|---|---|---|
| Comp. Ex. 1 | Metal roll* | 90 | 330 | 200 | 70 | 24 | 350 | 0.50 | 1.00 | 100,000 |
| Comp. Ex. 2 | Metal roll | 80 | 330 | 200 | 70 | 24 | 350 | 0.50 | 1.05 | 100,000 |
| Comp. Ex. 3 | Metal roll | 70 | 300 | 200 | 70 | 24 | 350 | 0.50 | 1.00 | 100,000 |
| Comp. Ex. 4 | Metal roll | 60 | 300 | 200 | 70 | 24 | 300 | 0.50 | 1.05 | 100,000 |
| Ex. 1 | Metal roll | 80 | 280 | 180 | 70 | 24 | 300 | 0.25 | 1.00 | 100,000 |
| Ex. 2 | Metal roll | 80 | 280 | 180 | 70 | 24 | 300 | 0.30 | 1.05 | 100,000 |
| Ex. 3 | Elastic roll** | 90 | 280 | 180 | 70 | 24 | 300 | 0.50 | 1.00 | 200,000 |
| Ex. 4 | Elastic roll | 90 | 250 | 150 | 70 | 24 | 300 | 0.50 | 1.05 | 200,000 |

TABLE 1-continued

Manufacturing Conditions in Examples and Comparative Examples

| | | | | | | | | | | |
|---|---|---|---|---|---|---|---|---|---|---|
| Ex. 5 | Elastic roll | 80 | 250 | 150 | 70 | 24 | 300 | 0.70 | 1.00 | 300,000 |
| Ex. 6 | Elastic roll | 70 | 250 | 150 | 70 | 24 | 300 | 0.70 | 1.05 | 300,000 |
| Comp. Ex. 5 | Elastic roll | 60 | 250 | 150 | 70 | 24 | 250 | 0.50 | 1.00 | 300,000 |
| Comp. Ex. 6 | Elastic roll | 60 | 250 | 150 | Without treatment | | 250 | 0.50 | 1.05 | 300,000 |

Metal roll*: apparatus comprising a metal roll and an elastic roll
Elastic roll**: apparatus comprising elastic rolls alone

TABLE 2

Results of Evaluation in Examples and Comparative Examples

| Example No. | Base Convex Amount on the Forced Side (μm) | Base Convex Amount on the Unforced Side (μm) | α on the Unforced Side (degree) | Young's Modulus of Magnetic Layer Surface (kg/mm$^2$) | (GPa) | Young's Modulus of Back Layer Surface (kg/mm$^2$) | (GPa) | Winding Shape | Head Soiling | C/N (dB) | DO (number/MB) |
|---|---|---|---|---|---|---|---|---|---|---|---|
| Comp. Ex. 1 | 0.5 | 0.2 | 95 | 2,700 | 26.46 | 2,500 | 24.5 | ⊚ | X | −2 | 72 |
| Comp. Ex. 2 | 0.4 | 0.1 | 93 | 2,500 | 24.50 | 2,400 | 23.52 | ⊚ | X | −1.2 | 45 |
| Comp. Ex. 3 | 0.5 | 0.2 | 95 | 2,550 | 24.99 | 2,200 | 21.56 | ⊚ | X | −0.5 | 7 |
| Comp. Ex. 4 | 0.3 | 0 | 92 | 2,500 | 24.50 | 2,300 | 22.54 | ⊚ | Δ | 0.3 | 3 |
| Ex. 1 | 0 | −0.2 | 90 | 2,500 | 24.50 | 2,000 | 19.60 | ⊚ | ○ | 0.2 | 1.5 |
| Ex. 2 | −0.5 | −0.4 | 88 | 2,300 | 22.54 | 1,800 | 17.64 | ⊚ | ○ | 1.5 | 0.6 |
| Ex. 3 | −0.7 | −0.6 | 84 | 1,500 | 14.70 | 1,300 | 12.74 | ○ | ⊚ | 2.5 | 0.8 |
| Ex. 4 | −1 | −0.8 | 80 | 1,300 | 12.74 | 800 | 7.84 | ○ | ⊚ | 2 | 1 |
| Ex. 5 | −1.1 | −1.7 | 78 | 1,250 | 12.25 | 700 | 6.86 | ○ | ⊚ | 0.7 | 0.7 |
| Ex. 6 | −1.1 | −1.9 | 75 | 1,000 | 9.80 | 600 | 5.88 | ○ | ○ | 0 | 0.5 |
| Comp. Ex. 5 | −1.2 | −2.1 | 74 | 750 | 7.35 | 800 | 7.84 | Δ | Δ | −0.5 | 2 |
| Comp. Ex. 6 | −1.2 | −2.1 | 70 | 783 | 7.67 | 450 | 4.41 | X | X | −1.5 | 10 |

Summary of Evaluation:

In Comparative Examples 1 to 4, although winding shape was good, head soiling and DO were bad and C/N was also low.

In Comparative Examples 5 and 6, since the rigidity of the magnetic layer and back layer was small, shaving occurred by running, winding shape was bad, C/N was inferior, and many DO were generated. On the other hand, in Examples 1 to 6, winding shape was good, low in head soiling, and DO was diminished.

This application is based on Japanese Patent application JP 2004-62652, filed Mar. 5, 2004, the entire content of which is hereby incorporated by reference, the same as if set forth at length.

What is claimed is:

1. A magnetic tape comprising: a coating layer containing ferromagnetic powder and a binder; a support; and a back layer, in this order, which satisfies the following conditions (1) to (3):
   (1) on a cut plane of the tape, an apex of a biggest convexity of the support does not protrude from a line connecting an apex of a biggest convexity of the coating layer and an apex of a biggest convexity of the back layer;
   (2) a Young's modulus in a thickness direction of a surface of the magnetic layer is from 1,000 to 2,500 kg/mm$^2$ (from 9.8 to 24.5 GPa); and
   (3) a Young's modulus in a thickness direction of a surface of the back layer is from 600 to 2,000 kg/mm$^2$ (from 5.9 to 19.6 GPa).

2. The magnetic tape according to claim 1, wherein the coating layer comprises a nonmagnetic layer containing nonmagnetic powder and a binder and a magnetic layer containing ferromagnetic powder and a binder, so that the support, the nonmagnetic layer and the magnetic layer are in this order.

3. The magnetic tape according to claim 1, wherein on the cut plane, an angle formed by the line connecting the apex of the biggest convexity of the coating layer and the apex of the biggest convexity of the back layer and an extended line of a surface of the back layer is from 60 to 90°.

4. The magnetic tape according to claim 3, wherein the angle is from 75 to 90°.

5. The magnetic tape according to claim 3, wherein the angle is from 80 to 88°.

6. The magnetic tape according to claim 1, wherein on another cut plane of an opposite side of the cut plane, an apex of a biggest convexity of the support does not protrude from a line connecting an apex of a biggest convexity of the coating layer and an apex of a biggest convexity of the back layer.

7. The magnetic tape according to claim 1, wherein the Young's modulus in a thickness direction of a surface of the magnetic layer is from 1,250 to 2,300 kg/mm$^2$ (from 12.25 to 22.54 GPa).

8. The magnetic tape according to claim 1, wherein the Young's modulus in a thickness direction of a surface of the magnetic layer is from 1,300 to 1,500 kg/mm$^2$ (from 12.74 to 14.70 GPa).

9. The magnetic tape according to claim 1, wherein the Young's modulus in a thickness direction of a surface of the back layer is from 700 to 1,800 kg/mm$^2$ (from 6.86 to 17.64 GPa).

10. The magnetic tape according to claim 1, wherein the Young's modulus in a thickness direction of a surface of the back layer is from 800 to 1,300 kg/mm$^2$ (from 7.84 to 12.74 GPa).

11. The magnetic tape according to claim 1, wherein a Young's modulus of a support in a machine direction is from 933 to 1,749 kg/mm$^2$ (from 9.15 to 17.15 GPa).

* * * * *